(12) United States Patent
Lin et al.

(10) Patent No.: US 10,923,830 B2
(45) Date of Patent: Feb. 16, 2021

(54) QUICK SOLDER CHIP CONNECTOR FOR MASSIVE MULTIPLE-INPUT MULTIPLE-OUTPUT ANTENNA SYSTEMS

(71) Applicant: PC-TEL, Inc., Bloomingdale, IL (US)

(72) Inventors: Jesse Lin, Lisle, IL (US); Umesh Navsariwala, Bartlett, IL (US)

(73) Assignee: PC-TEL, INC., Bloomingdale, IL (US)

( * ) Notice: Subject to any disclaimer, the term of this patent is extended or adjusted under 35 U.S.C. 154(b) by 29 days.

(21) Appl. No.: 16/251,649

(22) Filed: Jan. 18, 2019

(65) Prior Publication Data

US 2020/0235488 A1 Jul. 23, 2020

(51) Int. Cl.
*H01Q 21/00* (2006.01)
*H04B 7/0413* (2017.01)
*H01Q 21/29* (2006.01)

(52) U.S. Cl.
CPC ..... *H01Q 21/0031* (2013.01); *H01Q 21/0025* (2013.01); *H01Q 21/293* (2013.01); *H04B 7/0413* (2013.01)

(58) Field of Classification Search
CPC .. H01Q 1/50; H01Q 21/0006; H01Q 21/0025; H01Q 21/0031; H01Q 21/0075; H01Q 21/0081; H01Q 21/293; H01Q 21/30; H01Q 25/008; H01Q 15/04; H01Q 19/138; H01Q 5/30; H01Q 5/307; H01Q 5/314; H01Q 5/321; H01Q 5/40; H01Q 5/45; H01Q 5/47; H01Q 13/08; H01R 2201/02; H01R 9/03; H01R 9/05; H01R 33/20; H01R 33/205; H04B 7/02; H04B 7/04; H04B 7/0413
See application file for complete search history.

(56) References Cited

U.S. PATENT DOCUMENTS 5,860,812 A * 1/1999 Gugliotti ............... H01R 24/50
439/63
5,929,815 A * 7/1999 Elderfield ............. H01Q 1/242
343/702
5,963,111 A * 10/1999 Anderson ............. H01P 5/085
333/128

(Continued)

OTHER PUBLICATIONS

Radiall® The next conneXion, SMP-MAX series, R222M, Jun. 5, 2012.

(Continued)

*Primary Examiner* — Jason Crawford
(74) *Attorney, Agent, or Firm* — Husch Blackwell LLP

(57) ABSTRACT

A quick solder chip connector is provided that can include a body, a radio signal conductor housed in the body, and one or more grounding pins integrally formed in the body. In some embodiments, the radio signal conductor can include a first end configured to electrically connect to a first transmission line formed on a first printed circuit board and a second end configured to electrically connect to a second transmission line formed on a second printed circuit board and can provide a radio frequency signal path between the first transmission line and the second transmission line. The one or more grounding pins can extend from opposing ends of the body and can be configured to physically support the body and the radio signal conductor between the first printed circuit board and the second printed circuit board.

20 Claims, 8 Drawing Sheets

(56) References Cited

U.S. PATENT DOCUMENTS

| | | | | |
|---|---|---|---|---|
| 6,648,653 B2* | 11/2003 | Huang | ............... | H01R 24/50 439/582 |
| 6,790,056 B2 | 9/2004 | Buondelmonte et al. | | |
| 6,992,544 B2* | 1/2006 | Barnes | ............... | H01P 5/085 333/260 |
| 7,478,475 B2* | 1/2009 | Hall | ............... | H01R 24/542 29/869 |
| 8,814,601 B1* | 8/2014 | Sherrer | ............... | H01R 24/50 439/625 |
| 9,472,860 B1* | 10/2016 | Wiser | ............... | H01Q 21/0087 |
| 10,530,068 B2* | 1/2020 | Mirmozafari | ............... | H01Q 5/48 |
| 10,608,392 B2* | 3/2020 | Duan | ............... | H01R 13/6588 |
| 2002/0037656 A1* | 3/2002 | Murakami | ............... | H05K 3/368 439/74 |
| 2004/0175978 A1* | 9/2004 | Mugiuda | ............... | H01R 24/46 439/188 |
| 2004/0202432 A1* | 10/2004 | Baek | ............... | H05K 1/0243 385/88 |
| 2006/0063287 A1 | 3/2006 | Andrews | | |
| 2007/0148996 A1* | 6/2007 | Hildebrand | ............... | H01R 24/50 439/63 |
| 2010/0255688 A1* | 10/2010 | Steinkamp | ............... | H01R 13/64 439/63 |
| 2010/0265146 A1* | 10/2010 | Montgomery | ............... | H01Q 1/38 343/722 |
| 2012/0183300 A1* | 7/2012 | Liu | ............... | H05K 1/141 398/116 |
| 2014/0152510 A1* | 6/2014 | Manry, Jr. | ............... | H01Q 9/0457 343/700 MS |
| 2015/0097737 A1* | 4/2015 | Vemagiri | ............... | H01Q 1/50 343/702 |
| 2015/0380384 A1* | 12/2015 | Williams | ............... | H01L 23/49555 438/112 |
| 2016/0087326 A1* | 3/2016 | Wilkins | ............... | H01P 3/08 333/238 |
| 2016/0105963 A1* | 4/2016 | Isom | ............... | H05K 3/366 343/906 |
| 2017/0084971 A1* | 3/2017 | Kildal | ............... | H01P 3/12 |
| 2017/0104277 A1* | 4/2017 | Viscarra | ............... | H01Q 21/0025 |
| 2017/0301997 A1* | 10/2017 | Kosaka | ............... | H04B 7/0608 |
| 2017/0324171 A1* | 11/2017 | Shehan | ............... | H01Q 1/246 |
| 2018/0006380 A1 | 1/2018 | Lo Hine Tong et al. | | |
| 2018/0109006 A1* | 4/2018 | Ng | ............... | H01Q 1/42 |
| 2018/0323513 A1* | 11/2018 | Varnoosfaderani | ............... | H01Q 5/364 |
| 2018/0358706 A1* | 12/2018 | Kildal | ............... | H01Q 1/246 |
| 2019/0074569 A1* | 3/2019 | Kamo | ............... | G01S 13/345 |
| 2019/0089068 A1* | 3/2019 | Franzini | ............... | H01Q 21/22 |
| 2019/0123443 A1* | 4/2019 | Russell | ............... | H01Q 21/0025 |
| 2020/0006862 A1* | 1/2020 | Thompson, Jr. | ... | H01Q 21/0031 |
| 2020/0059010 A1* | 2/2020 | Yang | ............... | H01Q 25/001 |

OTHER PUBLICATIONS

Radiall™ Technical Data Sheet—Straight Press Mount Male Receptacle Front Mount—With Cylindrical Contact, Mar. 27, 2018.
Radiall™ Technical Data Sheet—Board to Board Adaptor H=4 MM, Jun. 11, 2018.
PCT Written Opinion of the International Searching Authority for corresponding PCT application PCT/US20/14439 dated Apr. 16, 2020.
PCT International Search Report for corresponding PCT application PCT/US20/14439 dated Apr. 16, 2020.

\* cited by examiner

LEGEND:
A: RADIAL MISALIGNMENT
B: AXIAL MISALIGNMENT
C: BULLET HEIGHT
D: BOARD-TO-BOARD DISTANCE

QUICK SOLDER CHIP CONNECTOR FOR MASSIVE MULTIPLE-INPUT MULTIPLE-OUTPUT ANTENNA SYSTEMS

FIELD

The present invention relates generally to massive multiple-input multiple-output antenna systems. More particularly, the present invention relates to a quick solder chip connector for massive multiple-input multiple-output antenna systems.

BACKGROUND

Increased demand for mobile broadband services and 5G technology has required operators to increase network capacity from existing spectrums, and massive multiple-input multiple-output (MIMO) technology is one technology for delivering such an increase in the network capacity. Massive MIMO technology is an extension of standard MIMO technology that groups together antennas at a transmitter and a receiver to provide better throughput and better spectrum efficiency. For example, a 128-antenna array in a 64-transmit/64-receive configuration can deploy a 16 layer massive MIMO configuration that employs carrier aggregation with a broad range of customized variants to deliver up to five times more network capacity, a high peak downlink throughput, significantly improved uplink, and greater coverage when compared to standard MIMO configurations. Massive MIMO technology can also be used in conjunction with 3D beamforming technology to provide wider coverage and better indoor penetration.

However, as seen in FIG. 1, the large number of antennas in massive MIMO configurations proportionately increases the number of RF cables and connectors required for connections from a radio board to an antenna board. In most cases, there is limited space for such an increased number of RF cables and connectors, which makes it difficult to accommodate all of the RF cables and connectors required and still maintain good performance levels without a substantial increase in cost and complexity. For example, a typical 5G CBRS massive MIMO array can include upwards of 128 antenna elements, each of which includes a distinct RF feed connection.

Proper operation of these large MIMO systems requires a good RF feed connection for each antenna between the antenna board and the radio board. For example, a good RF feed connection requires both signal and ground lines to be connected with a proper mechanism to maintain proper transmission line impedance throughout the RF feed connection. Accordingly, RF feed connections known in the art typically include a coaxial cable and a connector that have equal ratios of a diameter of a center conductor (signal) to a diameter of an outer conductor (ground) so that a 50 Ohm impedance can be maintained along an entire length of the RF feed connection. However, such traditional connections are large, overly expensive, cumbersome, and error prone in assembly.

One known solution to address the above-identified issues is shown in FIG. 2A, FIG. 2B, FIG. 2C, and FIG. 3 and includes a three component board-to-board system 10 for connecting an antenna printed circuit board (PCB) to a radio transceiver PCB via first and second PCB surface mount connectors 11, 12 and a bullet adapter 13. As seen in FIG. 3, the first and second PCB surface mount connectors 11, 12 can be integrated with the antenna and radio transceiver PCBs, respectively, and the bullet adapter 13 can provide an electrical connection between the first and second PCB surface mount connectors 11, 12. However, the three component board-to-board system 10 suffers from several known problems. First, the three component board-to-board system 10 utilizes blind-mating of the bullet adapter 13 to provide an RF link between the first and second PCB surface mount connectors 11, 12, which limits an operating frequency to a maximum of 6 GHz. Second, the three component board-to-board system 10 utilizes three distinct parts, which increases complexity, time for assembly, and expense for parts and labor. Third, as seen in FIG. 3, employing three distinct components typically results in axial and radial misalignment, which results in mismatch and phase errors, thereby causing RF performance degradation.

Other known solutions are shown in FIG. 4A, FIG. 4B, FIG. 4C, FIG. 4D, FIG. 5A, and FIG. 5B. The solution shown in FIG. 4A, FIG. 4B, FIG. 4C, and FIG. 4D includes a one component board-to-board system 14a for connecting an antenna PCB to a radio transceiver PCB via a contact component 15a. As seen in FIG. 4A and FIG. 4B, the contact component 15a can be integrated with one of the antenna or radio transceiver PCBs, and outer and center contact portions of the contact component 15a can connect to RF paths under a pressure between the antenna and radio transceiver PCBs. Similarly, the solution shown in FIG. 5A and FIG. 5B includes a two component board-to-board system 14b for connecting the antenna PCB to the radio transceiver PCB via a contact component 15b and a press-mount receptacle component 16. As seen in FIG. 5A, the contact component 15b and the press-mount receptacle component 16 can be integrated with the antenna and radio transceiver PCBs, respectively, and the outer and center contact portions of the contact component 15b can mate with the press-mount receptacle component 16 to provide an RF link between the antenna and radio transceiver PCBs. However, both the one component board-to-board system 14a and the two component board-to-board system 14b also suffer from several known problems. First, the outer and center contact portions of the contact component 15a, 15b are made from bent sheet metal pieces, which prevent the one component board-to-board system 14a and the two component board-to-board system 14b from achieving a precise 50 Ohm impedance, thereby degrading RF performance at higher frequencies. Second, contact resistance of spring fingers that form the outer and center contact portions of the contact component 15a, 15b can degrade over time with varying environmental conditions, such as vibration and shock. Third, as with the three component board-to-board system 10, radial misalignments can occur that result in mismatch and phase errors that can cause RF performance degradation.

In view of the above, there is a continuing, ongoing need for improved connectors.

DETAILED DESCRIPTION

Figure 1:
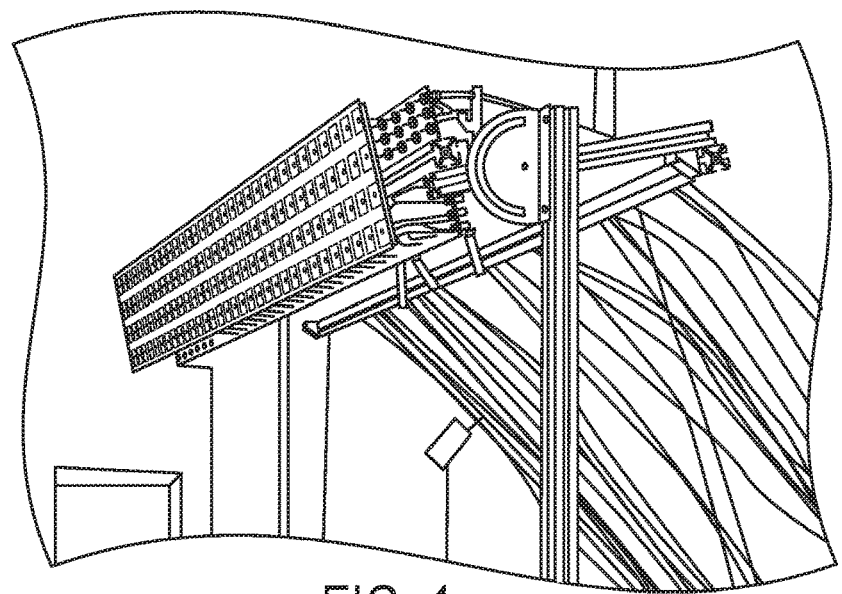
FIG. 1 is a perspective view of a massive multiple-input multiple-output antenna system known in the art.
Figure 2A:
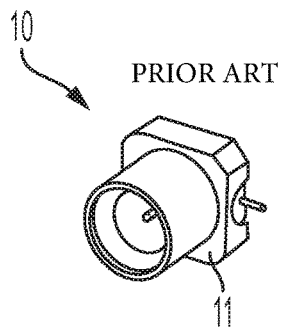
FIG. 2A is a perspective view of one component of a three component board-to-board connector system for massive multiple-input multiple-output antenna systems known in the art.
Figure 2B:
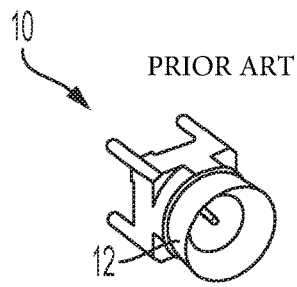
FIG. 2B is a perspective view of one component of a three component board-to-board connector system for massive multiple-input multiple-output antenna systems known in the art.
Figure 2C:
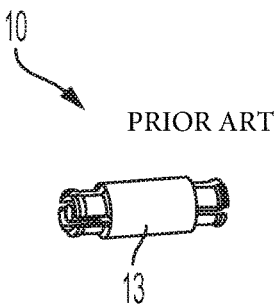
FIG. 2C is a side view of one component of a three component board-to-board connector system for massive multiple-input multiple-output antenna systems known in the art.
Figure 3:
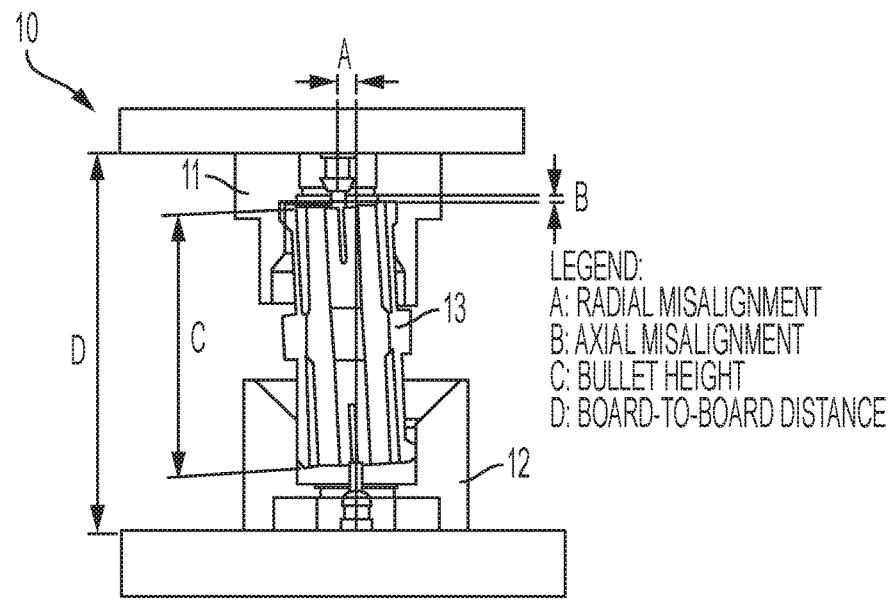
FIG. 3 is a cross-sectional view of a three component board-to-board connector system for massive multiple-input multiple-output antenna systems known in the art.
Figure 4A:
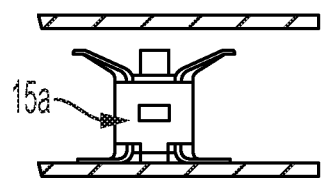
FIG. 4A is a side view of a one component board-to-board connector system for massive multiple-input multiple-output antenna systems known in the art.
Figure 4B:
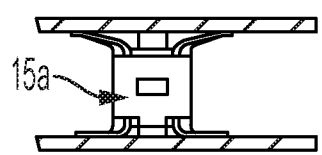
FIG. 4B is a side view of a one component board-to-board connector system for massive multiple-input multiple-output antenna systems known in the art.
Figure 4C:
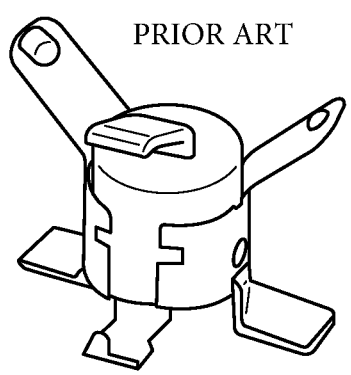
FIG. 4C is a perspective view of a one component board-to-board connector system for massive multiple-input multiple-output antenna systems known in the art.
Figure 4D:
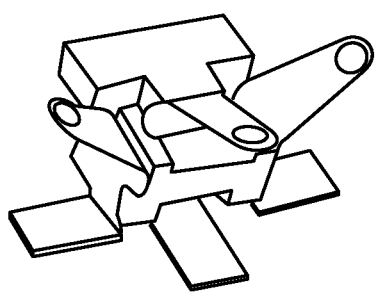
FIG. 4D is a perspective view of a one component board-to-board connector system for massive multiple-input multiple-output antenna systems known in the art.
Figure 5A:
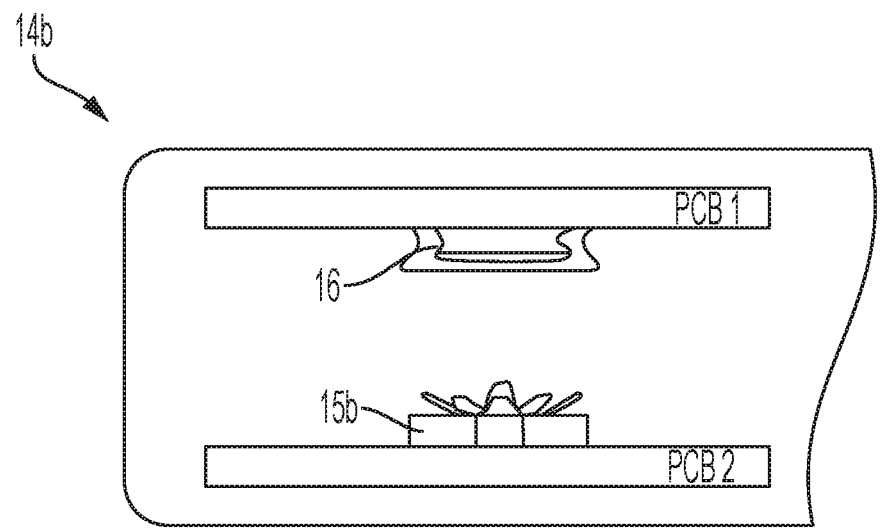
FIG. 5A is a side view of a two component board-to-board connector system for massive multiple-input multiple-output antenna systems known in the art.
Figure 5B:
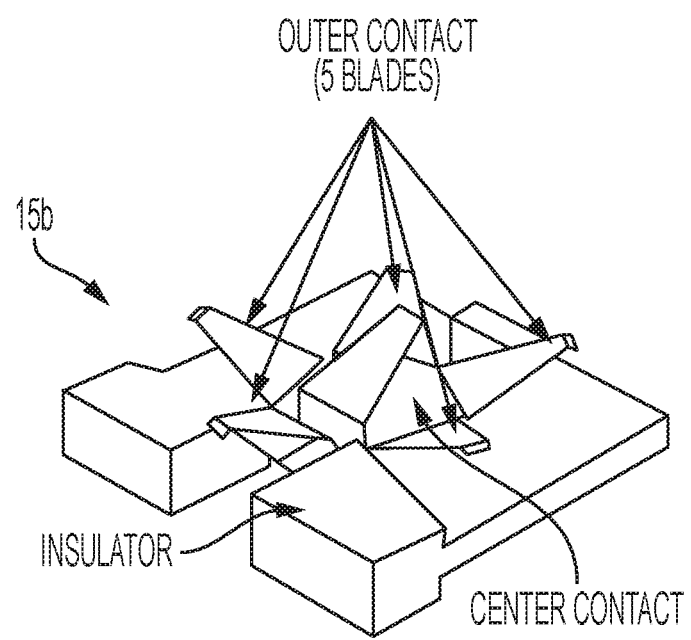
FIG. 5B is a perspective view of one component of a two component board-to-board connector system for massive multiple-input multiple-output antenna systems known in the art.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include a quick solder chip connector. The quick solder chip connector can feature a small foot print (e.g. 3.25 mm×3.25 mm) and a low body height (e.g. 3 mm), and in some embodiments, the body height of the quick solder chip connector can be adjusted for different operating environments. A radio frequency performance of a system employing the quick solder chip connector or a plurality of quick solder chip connectors can be up to 9 GHz and can be optimized for other frequency ranges, depending on a size and precision manufacturing of the quick solder chip connector. Advantageously, the quick solder chip connector can provide low cost, high accuracy, and high performance by substituting a single interconnect component for multiple components used in known systems and methods, thereby reducing a risk of performance degradation due to axial or radial misalignment.

Figure 6:
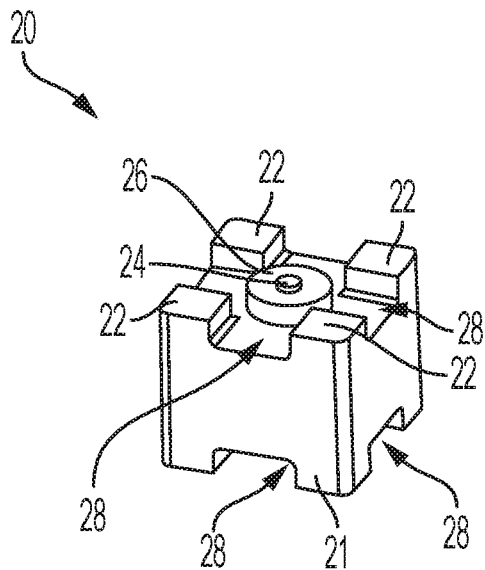
FIG. 6 is a perspective view of a quick solder chip connector in accordance with disclosed embodiments.
Figure 7:
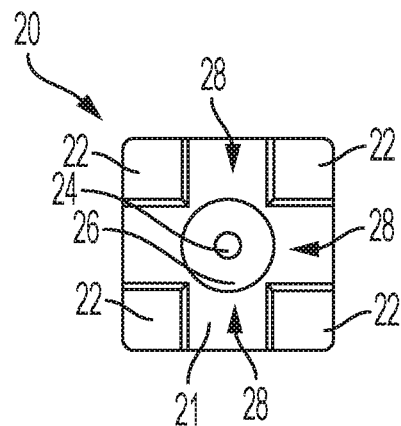
FIG. 7 is a top view of a quick solder chip connector in accordance with disclosed embodiments.

FIG. 6 is a perspective view of a quick solder chip connector 20 in accordance with disclosed embodiments, and FIG. 7 is a top view of the quick solder chip connector 20 in accordance with disclosed embodiments. As seen in FIG. 6 and FIG. 7, the quick solder chip connector 20 can include a body 21, one or more grounding pins 22, a radio signal conductor 24, an electrical insulator 26 disposed between the radio signal conductor 24 and the one or more grounding pins 22, and slots 28 disposed between the one or more grounding pins 22. In some embodiments, an inner diameter of the radio signal conductor 24 can be 0.45 mm, and an outer diameter of the electrical insulator 26 can be 1.5 mm.

As seen in FIG. 6 and FIG. 7, in some embodiments, the one or more grounding pins can be integrally formed with the body 21 and can extend from opposing ends of the body 21 so as to be configured to physically support the quick solder chip connector 20 between a first printed circuit board and a second printed circuit board, for example, as seen in FIGS. 9-13. In some embodiments, the body 21 can house the radio signal conductor 24 and the electrical insulator 26.

Various shapes are contemplated for a combination of the body 21 and the one or more grounding pins 22, and such shapes can include, but are not limited to a cylinder, a cube, and a rectangular prism. Similarly, various shapes are contemplated for each of the one or more grounding pins 22, and such shapes can include, but are not limited to a circle, a rectangle, and a square. Furthermore, various configurations for the one or more grounding pins 22 are contemplated, and such configurations can include, but are not limited to a single grounding pin integrated with the body 21, two grounding pins integrated with the body 21, three grounding pins integrated with the body 21, and four or more grounding pins integrated with the body 21.

Figure 8:
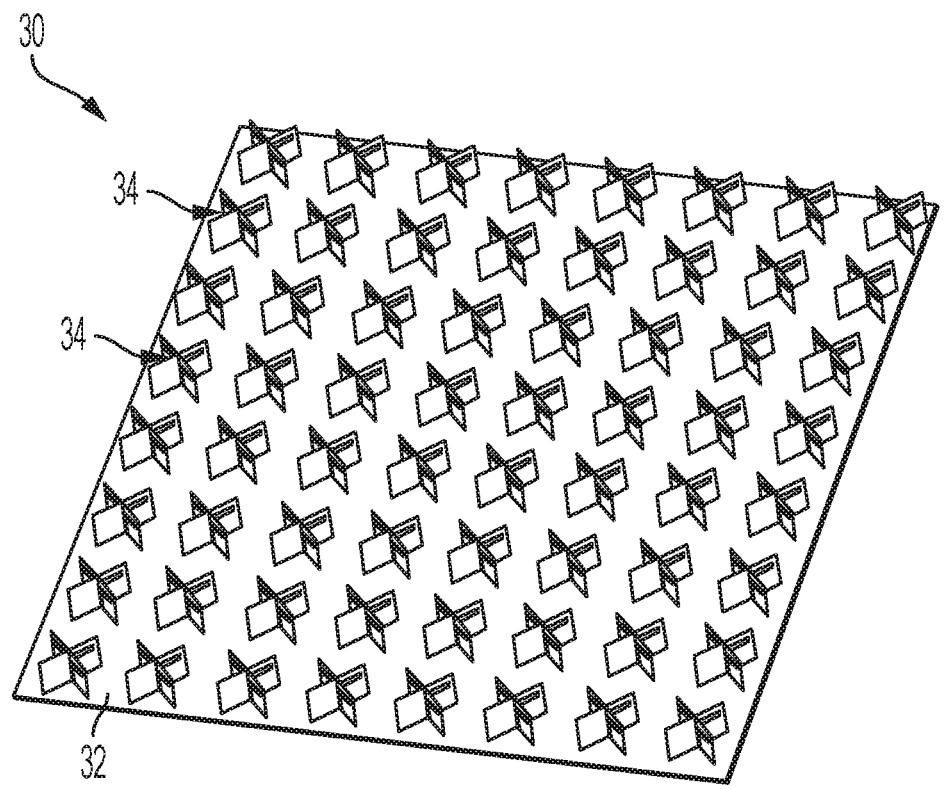
FIG. 8 is a perspective view of a massive multiple-input multiple-output antenna array for use in connection with a plurality of quick solder chip connectors in accordance with disclosed embodiments.
Figure 9:
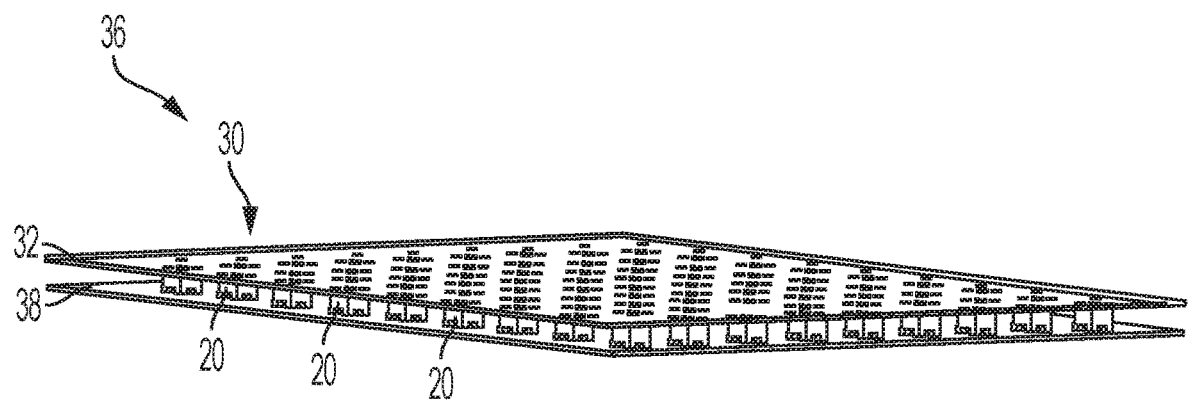
FIG. 9 is a perspective view of a massive multiple-input multiple-output antenna system connected via a plurality of quick solder chip connectors in accordance with disclosed embodiments.

FIG. 8 is a perspective view of a massive multiple-input multiple-output (MIMO) antenna array 30 for use in connection with a plurality of quick solder chip connectors 20 in accordance with disclosed embodiments, and FIG. 9 is a perspective view of a massive MIMO antenna system 36 connected via the plurality of quick solder chip connectors 20 in accordance with disclosed embodiments. As seen in FIG. 8, the massive MIMO antenna array 30 can include a plurality of antenna elements 34 mounted to a printed circuit board 32, and as seen in FIG. 9, the massive MIMO antenna array 30 can be connected to a printed circuit board 38 via the plurality of quick solder chip connectors 20 to form the massive MIMO antenna system 36. In some embodiments, the printed circuit board 38 can connect the plurality of antenna elements 34 to a radio frequency signal source.

Figure 10:
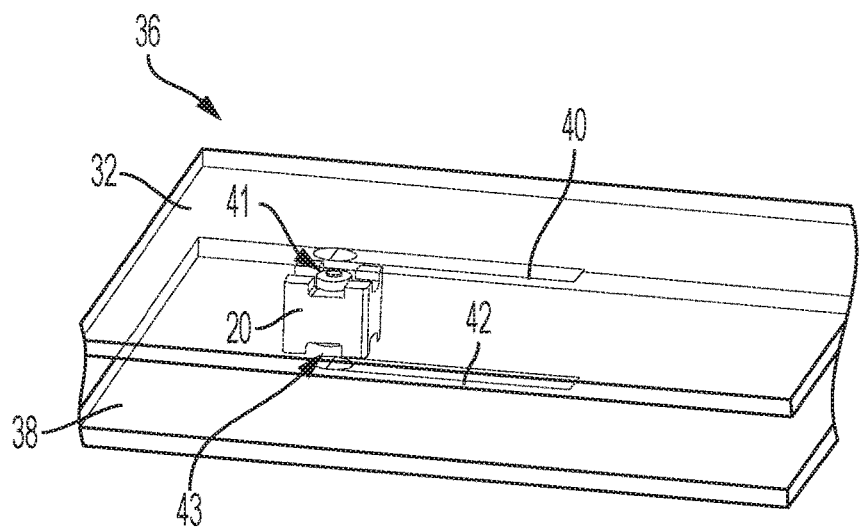
FIG. 10 is a perspective view of a portion of a massive multiple-input multiple-output antenna system connected via a quick solder chip connector in accordance with disclosed embodiments.

FIG. 10 is a perspective view of a portion of the massive MIMO antenna system 36 connected via the quick solder chip connector 20 in accordance with disclosed embodiments. As seen in FIG. 10, the printed circuit board 32 can include a transmission line 40 that can be connected to a first end 41 of the radio signal conductor 24 of the quick solder chip connector 20, and the printed circuit board 38 can include a transmission line 42 that can be connected to a second end 43 of the radio signal conductor 24 of the quick solder chip connector 20. In some embodiments, the transmission line 40 can be connected to one of the plurality of antenna elements 34 of the massive MIMO antenna array 30, the transmission line 42 can be connected to the radio frequency signal source, and the radio signal conductor 24 can provide a radio frequency signal path between the radio frequency signal source and the one of the plurality of antenna elements 34.

Figure 11:
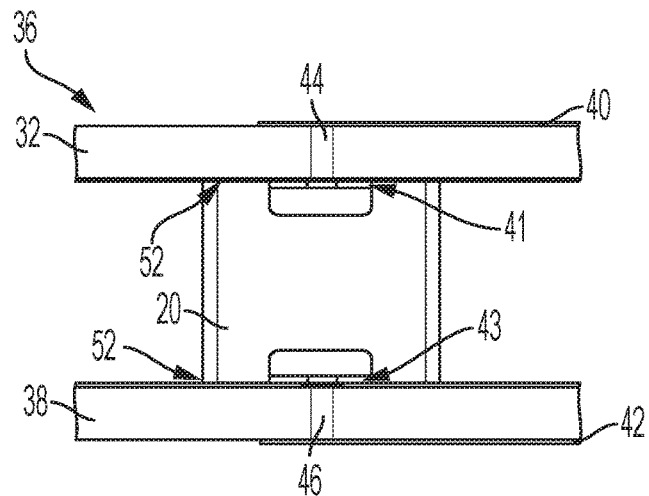
FIG. 11 is a side view of a portion of a massive multiple-input multiple-output antenna system connected via a quick solder chip connector in accordance with disclosed embodiments.
Figure 12:
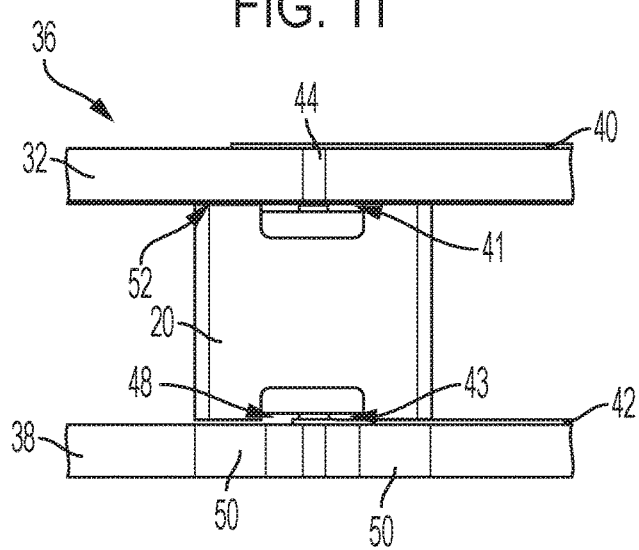
FIG. 12 is a side view of a portion of a massive multiple-input multiple-output antenna system connected via a quick solder chip connector in accordance with disclosed embodiments.
Figure 13:
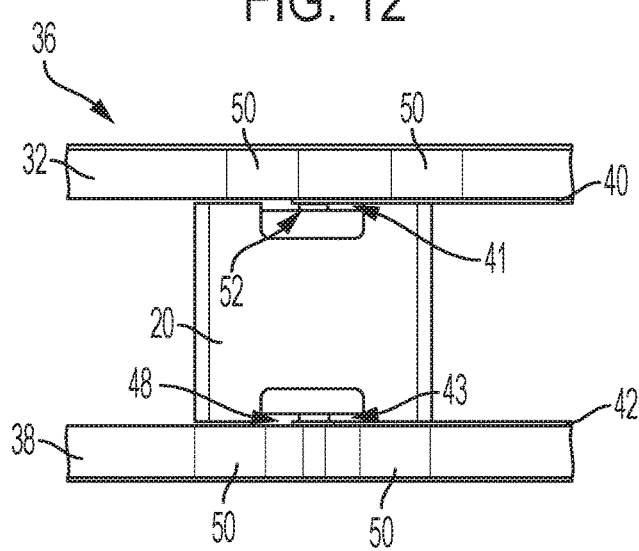
FIG. 13 is a side view of a portion of a massive multiple-input multiple-output antenna system connected via a quick solder chip connector in accordance with disclosed embodiments.

FIGS. 11-13 are side views of the portion of the massive MIMO antenna system 36 connected via the quick solder chip connector 20 in accordance with disclosed embodiments. As seen in FIGS. 11-13, different configurations for the transmission lines 40, 42 are contemplated.

For example, as seen in FIG. 11, both of the transmission lines 40, 42 can be formed on exterior layers of the printed circuit boards 32, 38. In such embodiments, the transmission lines 40, 42 can be connected to the first and second ends 41, 43 of the radio signal conductor 24 via plated through holes 44, 46 formed in the printed circuit boards 32, 38. In some embodiments, the plated through holes 44, 46 can include standard printed circuit board vias.

However, as seen in FIG. 12, in some embodiments, the transmission line 40 can be formed on the exterior layer of the printed circuit board 32, and the transmission line 42 can be formed on an interior layer of the printed circuit board 38. In such embodiments, the transmission line 40 can be connected to the first end 41 of the radio signal conductor 24 via the plated through hole 44, and the transmission line 42 can be connected to the second end 43 of the radio signal conductor 24 via a direct connection 48.

However, as seen in FIG. 13, in some embodiments, the transmission line 40 can be formed on an interior layer of the printed circuit board 32, and the transmission line 42 can be formed on the interior layer of the printed circuit board 38. In such embodiments, the transmission line 40 can be connected to the first end 41 of the radio signal conductor 24 via a direct connection 52, and the transmission line 42 can be connected to the second end 43 of the radio signal conductor 24 via the direct connection 48. In some embodiments, the direct connections 48, 52 and the plated though holes 44, 46 can include or be achieved by soldered connections formed from one or more solder reflow processes known in the art.

Other configurations that include the transmission lines 40, 42 embedded within the printed circuit boards 32, 38 are also contemplated.

In any embodiment in which one or both of the transmission lines 40, 42 are formed on the interior layers of the printed circuit boards 32, 38, the slots 28 of the quick solder chip connector 20 can provide non-conductive routes for the transmission lines 40, 42 between the one or more grounding pins 22.

As seen in FIGS. 11-13, the quick solder chip connector 20 can be connected to a ground reference via plated through holes 50 or via direct surface connections 52. For example, the one or more grounding pins 22 of the quick solder chip connector 20 can be soldered directly to the ground reference via the direct surface connections 52 or can be soldered to the plated through holes 50 for connecting to the ground reference.

Figure 14:
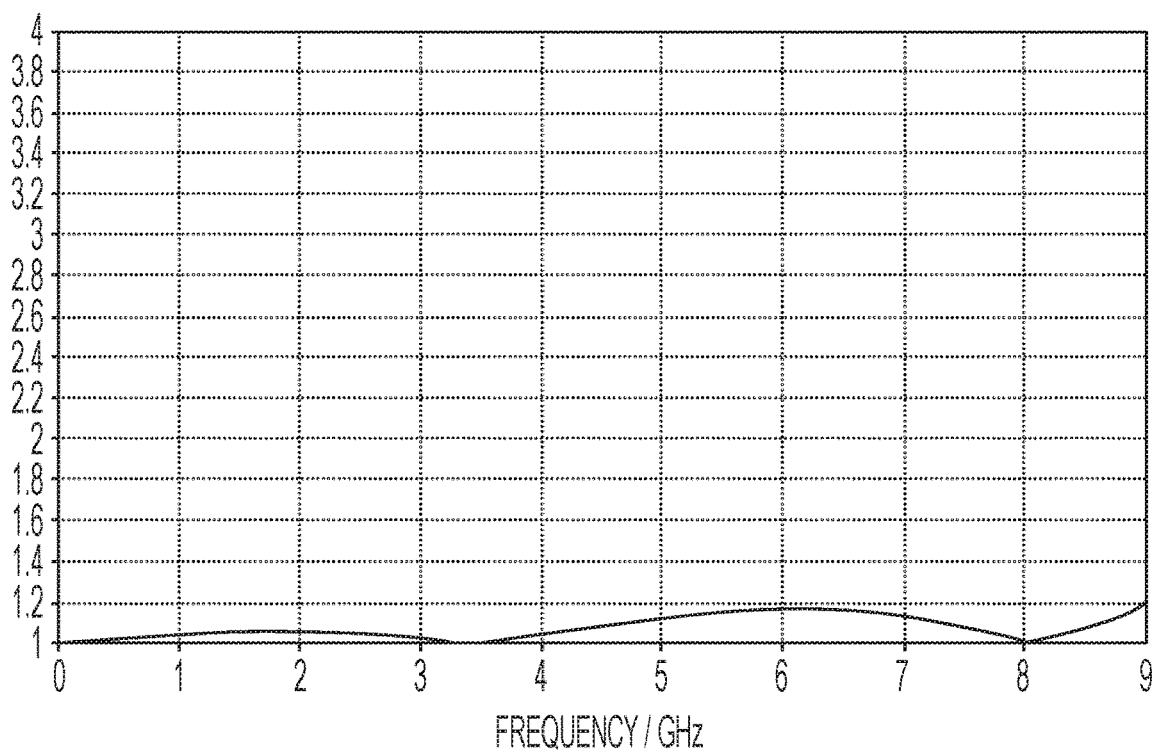
FIG. 14 is a graph of a simulated voltage standing wave ratio of a quick solder chip connector in accordance with disclosed embodiments.
Figure 15:
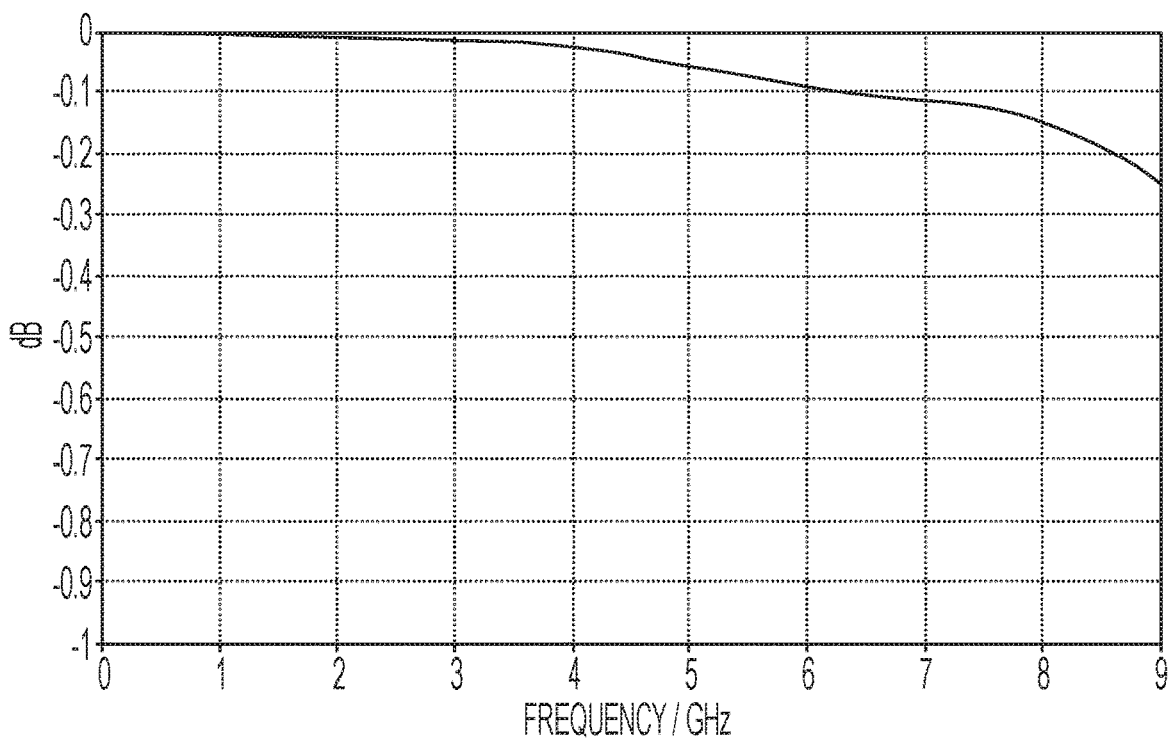
FIG. 15 is a graph of simulated insertion loss of a quick solder chip connector in accordance with disclosed embodiments.

FIG. 14 is a graph of a simulated voltage standing wave ratio (VSWR) of the quick solder chip connector 20 in accordance with disclosed embodiments, and FIG. 15 is a graph of simulated insertion loss of the quick solder chip connector 20 in accordance with disclosed embodiments. As seen in FIG. 14, the quick solder chip connector 20 can produce a VSWR of less than 1.2 up to an operating frequency of 9 GHz, and as seen in FIG. 15, the quick solder chip connector 20 can produce an insertion loss of less than 0.25 up to an operating frequency of 9 GHz.

Figure 16:
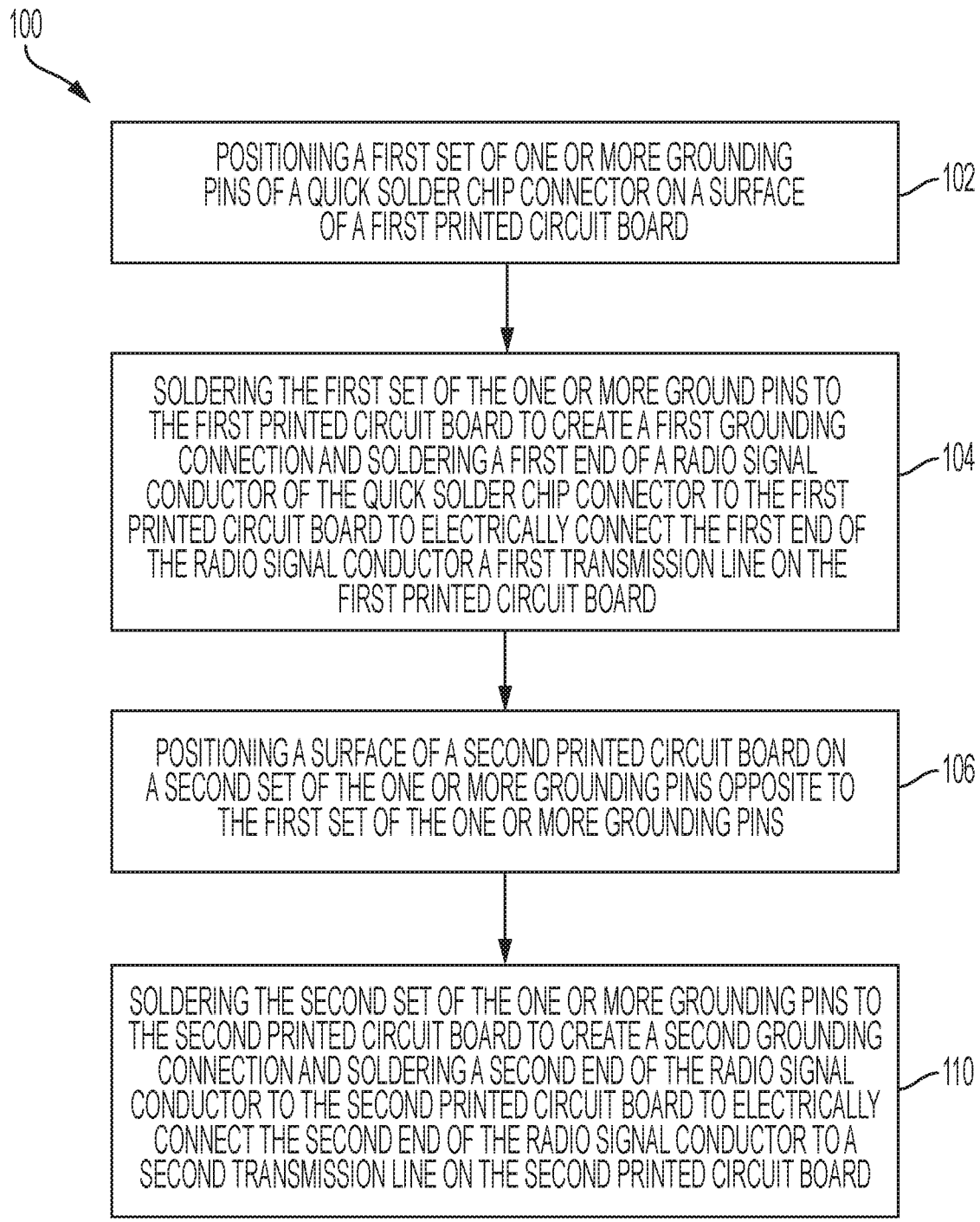
FIG. 16 is a flow diagram of a method in accordance with disclosed embodiments.

FIG. 16 is a flow diagram of a method 100 for manufacturing the massive MIMO antenna system 36 in accordance with disclosed embodiments. The method 100 can include positioning a first set of the one or more grounding pins 22 of the quick solder chip connector 20 on a surface of the printed circuit board 32, as in 102, soldering the first set of the one or more grounding pins 22 to the printed circuit board 32 to create a first grounding connection and soldering the first end 41 of the radio signal conductor 24 to the printed circuit board 32 to electrically connect the first end 41 of the radio signal conductor 24 to the transmission line 40 on the printed circuit board 32, as in 104, and positioning a surface of the printed circuit board 38 on a second set of the one or more grounding pins 22 opposite the first set of the one or more grounding pins 22, as in 106. Additionally or alternatively, in some embodiments, the quick solder chip connector 20 and the printed circuit board 32 can be positioned with respect to the printed circuit board 38. In any embodiment, the method 100 can also include soldering the second set of the one or more grounding pins 22 to the printed circuit board 38 to create a second grounding connection and soldering the second end 43 of the radio signal conductor 24 to the printed circuit board 38 to electrically connect the second end 43 of the radio signal conductor 24 to the transmission line 42 on the printed circuit board 38, as in 108.

In some embodiments, the method 100 can include soldering both the first set of the one or more grounding pins 22 and the first end 41 of the radio signal conductor 24 to the printed circuit board 32, as in 104, using a first reflow soldering process at a first temperature and soldering both the second set of the one or more grounding pins 22 and the second end 43 of the radio signal conductor 24 to the printed circuit board 38, as in 108, using a second reflow soldering process at a second temperature that is lower than the first temperature. Using a lower temperature for the second reflow soldering process can prevent solder applied during the first reflow soldering process from melting during the second reflow soldering process.

In some embodiments, a combination of the quick solder chip connector 20 and the printed circuit board 32 can be supplied as a single unit to a radio manufacturer that supplies the printed circuit board 38. In such embodiments, the radio manufacturer can separately solder the second set of the one or more ground pins 22 and the second end 43 of the radio signal conductor 24 to the printed circuit board 38 as described herein.

In some embodiments, the method 100 can include supplying the quick solder chip connector 20 to a pick and place machine in a tape and real format to provide for increased manufacturing reliability and time savings. For example, the pick and place machine can retrieve the quick solder chip connector 20 from a tape and reel and position the quick solder chip connector 20 so that the first set of the one or more grounding pins 22 are on the surface of the printed circuit board 32.

Although a few embodiments have been described in detail above, other modifications are possible. For example, other components may be added to or removed from the described systems, and other embodiments may be within the scope of the invention. Additionally, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A quick solder chip connector comprising:
   a body;
   a radio signal conductor housed in the body, the radio signal conductor including a first end of the radio signal conductor proximate a first end of the body and configured to electrically connect to a first transmission line formed on a first printed circuit board and a second end of the radio signal conductor proximate a second end of the body and configured to electrically connect to a second transmission line formed on a second printed circuit board; and
   one or more grounding pins integrally formed in the body,
   wherein the one or more grounding pins extend from opposing ends of the body and are configured to physically support the body and the radio signal conductor between the first printed circuit board and the second printed circuit board, and
   wherein the radio signal conductor is configured to provide a radio frequency signal path between the first transmission line and the second transmission line.

2. The quick solder chip connector of claim 1 further comprising:
   a first slot disposed between a first set of the one or more grounding pins proximate to the first end of the radio signal conductor,
   wherein the first slot is configured to provide a first non-conductive route for the first transmission line between the first set of the one or more grounding pins.

3. The quick solder chip connector of claim 2 further comprising:
   a second slot disposed between a second set of the one or more grounding pins proximate to the second end of the radio signal conductor,
   wherein the second slot is configured to provide a second non-conductive route for the second transmission line between the second set of the one or more grounding pins.

4. The quick solder chip connector of claim 1 wherein the first end of the radio signal conductor is configured to electrically connect to the first transmission line via a first plated through hole in the first printed circuit board or via a first direct connection to the first transmission line.

5. The quick solder chip connector of claim 4 wherein the second end of the radio signal conductor is configured to electrically connect to the second transmission line via a second plated through hole in the second printed circuit board or via a second direct connection to the second transmission line.

6. The quick solder chip connector of claim 1 further comprising:
   an electrical insulator disposed between the radio signal conductor and the one or more grounding pins.

7. The quick solder chip connector of claim 6 wherein the electrical insulator surrounds at least a portion of the radio signal conductor.

8. A system comprising:
   a first printed circuit board including an integrated antenna element and a first transmission line electrically connected to the integrated antenna element;
   a second printed circuit board including a second transmission line connected to a radio frequency signal source; and
   a quick solder chip connector including a body, a radio signal conductor housed in the body and having a first end of the radio signal conductor proximate a first end of the body and electrically connected to the first transmission line and a second end of the radio signal conductor proximate a second end of the body and electrically connected to the second transmission line, and one or more grounding pins integrally formed in the body,
   wherein the one or more grounding pins extend from opposing ends of the body and are configured to physically support the quick solder chip connector between the first printed circuit board and the second printed circuit board, and
   wherein the radio signal conductor provides a radio frequency signal path between the radio frequency signal source and the integrated antenna element.

9. The system of claim 8 wherein the quick solder chip connector includes a first slot disposed between a first set of the one or more grounding pins proximate to the first end of the radio signal conductor, and wherein, when the first transmission line is located on a first interior layer of the first printed circuit board, the first slot provides a first non-conductive route for the first transmission line between the first set of the one or more grounding pins.

10. The system of claim 9 wherein the quick solder chip connector includes a second slot disposed between a second set of the one or more grounding pins proximate to the second end of the radio signal conductor, and wherein, when the second transmission line is located on a second interior layer of the second printed circuit board, the second slot provides a second non-conductive route for the second transmission line between the second set of the one or more grounding pins.

11. The system of claim 8 wherein the first end of the radio signal conductor is electrically connected to the first transmission line via a first plated through hole in the first printed circuit board or via a first direct connection to the first transmission line.

12. The system of claim 11 wherein the second end of the radio signal conductor is electrically connected to the second transmission line via a second plated through hole in the second printed circuit board or via a second direct connection to the second transmission line.

13. The system of claim 8 wherein the quick solder chip connector includes an electrical insulator disposed between the radio signal conductor and the one or more grounding pins.

14. The system of claim 13 wherein the electrical insulator surrounds at least a portion of the radio signal conductor.

15. A method comprising:
positioning a first set of one or more grounding pins of a quick solder chip connector on a first surface of a first printed circuit board, wherein the first set of the one or more grounding pins is proximate to a first end of a body of the quick solder chip connector;
soldering the first set of the one or more grounding pins to the first printed circuit board to create a first grounding connection;
soldering a first end of a radio signal conductor in the body to the first printed circuit board to electrically connect the first end of the radio signal conductor to a first transmission line on the first printed circuit board;
positioning a second surface of a second printed circuit board on a second set of the one or more grounding pins, wherein the second set of the one or more grounding pins is proximate to a second end of the body that is opposite the first end of the body;
soldering the second set of the one or more grounding pins to the second printed circuit board to create a second grounding connection; and
soldering a second end of the radio signal conductor to the second printed circuit board to electrically connect the second end of the radio signal conductor to a second transmission line on the second printed circuit board.

16. The method of claim 15 further comprising:
soldering the first set of the one or more grounding pins and the first end of the radio signal conductor to the first printed circuit board using a first reflow soldering process at a first temperature; and
soldering the second set of the one or more grounding pins and the second end of the radio signal conductor to the second printed circuit board using a second reflow soldering process at a second temperature,
wherein the second temperature is lower than the first temperature.

17. The method of claim 15 further comprising:
supplying the quick solder chip connector to a pick and place machine in a tape and real format; and
the pick and place machine positioning the first set of the one or more grounding pins on the first surface of the first printed circuit board.

18. The method of claim 15 wherein the one or more grounding pins extend from opposing ends of the body to physically support the quick solder chip connector between the first printed circuit board and the second printed circuit board, wherein the first printed circuit board includes an antenna element, wherein the first transmission line is electrically connected to the antenna element, and wherein the radio signal conductor provides a radio frequency signal path between the second transmission line and the antenna element.

19. The method of claim 15 wherein the quick solder chip connector includes a first slot disposed between the first set of the one or more grounding pins and a second slot disposed between the second set of the one or more grounding pins, wherein, when the first transmission line is located on a first interior layer of the first printed circuit board, the first slot provides a first non-conductive route for the first transmission line between the first set of the one or more grounding pins, and wherein, when the second transmission line is located on a second interior layer of the second printed circuit board, the second slot provides a second non-conductive route for the second transmission line between the second set of the one or more grounding pins.

20. The method of claim 15 wherein the first end of the radio signal conductor is electrically connected to the first transmission line via a first plated through hole in the first printed circuit board or via a first direct connection to the first transmission line, and wherein the second end of the radio signal conductor is electrically connected to the second transmission line via a second plated through hole in the second printed circuit board or via a second direct connection to the second transmission line.

* * * * *